United States Patent
Bustamante Laparra

(10) Patent No.: US 10,343,655 B1
(45) Date of Patent: Jul. 9, 2019

(54) EMERGENCY BRAKING SYSTEM FOR VEHICLES

(71) Applicant: Julian Enrique Bustamante Laparra, Guatemala (GT)

(72) Inventor: Julian Enrique Bustamante Laparra, Guatemala (GT)

( * ) Notice: Subject to any disclaimer, the term of this patent is extended or adjusted under 35 U.S.C. 154(b) by 62 days.

(21) Appl. No.: 15/783,709

(22) Filed: Oct. 13, 2017

(51) Int. Cl.
*B60T 1/14* (2006.01)
*B60T 13/68* (2006.01)
*B60T 13/14* (2006.01)

(52) U.S. Cl.
CPC .............. *B60T 1/14* (2013.01); *B60T 13/14* (2013.01); *B60T 13/686* (2013.01)

(58) Field of Classification Search
CPC ...... B60T 13/686; B60T 7/042; B60T 8/4045; B60T 2201/03; B60T 8/3275; B60T 8/4827; B60T 13/142; B60T 13/22; B60T 8/17; B60T 13/268; B60T 13/66; B60T 7/04; B60T 7/06; B60T 8/4022; B60T 1/14
See application file for complete search history.

(56) References Cited

U.S. PATENT DOCUMENTS

| | | | |
|---|---|---|---|
| 2,049,357 A * | 7/1936 | Daignault | B60T 1/14 188/5 |
| 2,478,653 A * | 8/1949 | Callan | B60B 11/10 188/18 R |
| 2,692,658 A * | 10/1954 | Bigio | B60T 1/14 188/5 |
| 2,710,074 A * | 6/1955 | Simpson | B60T 1/14 188/5 |
| 2,796,150 A | 6/1957 | Gambardella | |
| 3,005,521 A * | 10/1961 | Blain | B60T 1/14 188/5 |
| 3,799,293 A * | 3/1974 | Howells | B60T 1/14 188/5 |
| 3,901,342 A * | 8/1975 | Nunn, Jr. | B62D 5/07 180/407 |
| 6,027,178 A * | 2/2000 | Oka | B60T 8/3275 303/11 |

(Continued)

FOREIGN PATENT DOCUMENTS

CN 203996165 U 12/2014
DE 2723811 A1 * 12/1978 ................ B60T 1/14

(Continued)

*Primary Examiner* — Bradley T King
*Assistant Examiner* — Mahbubur Rashid
(74) *Attorney, Agent, or Firm* — Albert Bordas, P.A.

(57) ABSTRACT

An emergency braking system for vehicles, having a hydraulic unit assembly, an oil accumulator assembly that connects to the hydraulic unit assembly, and a brake assembly that connects to the oil accumulator assembly. The brake assembly has at least one brake pad that is mounted underneath a vehicle. When deployed, the at least one brake pad makes contact to produce a predetermined friction with a surface the vehicle is moving upon to stop the vehicle. The hydraulic unit assembly has an oil reservoir connected to an electric motor. The oil accumulator assembly has an oil accumulator connected with a conduit to the oil reservoir. The brake assembly has a hydraulic cylinder and an emergency brake pedal that actuates a pedal switch actuator when the emergency brake pedal is pressed with a predetermined force.

1 Claim, 3 Drawing Sheets

(56) References Cited

U.S. PATENT DOCUMENTS

| | | | |
|---|---|---|---|
| 6,282,483 B1 * | 8/2001 | Yano | B60K 31/0008 |
| | | | 340/435 |
| 6,401,876 B1 | 6/2002 | Boros | |
| 7,165,658 B1 | 1/2007 | Kehoe | |
| 7,451,856 B2 * | 11/2008 | Miskin | B60T 13/04 |
| | | | 188/129 |
| 8,827,047 B2 | 9/2014 | Baker et al. | |
| 9,067,675 B2 | 6/2015 | Boren et al. | |
| 2008/0150351 A1 * | 6/2008 | Ruffer | B60K 6/543 |
| | | | 303/11 |
| 2011/0198161 A1 * | 8/2011 | Lomazzo | B60T 1/14 |
| | | | 188/5 |
| 2013/0037355 A1 | 2/2013 | Baker et al. | |
| 2016/0052493 A1 * | 2/2016 | Rydsmo | B60T 1/14 |
| | | | 188/5 |

FOREIGN PATENT DOCUMENTS

| | | | | |
|---|---|---|---|---|
| DE | 19533726 A1 * | 11/1996 | | B60T 1/14 |
| DE | 19811323 A1 | 9/1999 | | |
| DE | 19823228 A1 * | 12/1999 | | B60T 1/14 |
| DE | 102012207253 A1 * | 11/2013 | | B60T 1/14 |
| GB | 2248428 A | 4/1992 | | |
| WO | WO-0044599 A1 * | 8/2000 | | B60T 1/14 |
| WO | WO-0134444 A1 * | 5/2001 | | B60T 1/14 |

* cited by examiner

EMERGENCY BRAKING SYSTEM FOR VEHICLES

BACKGROUND OF THE INVENTION

1. Field of the Invention

The present invention relates to braking systems and more particularly, to emergency braking systems for vehicles.

2. Description of the Related Art

Applicant believes that one of the closest references corresponds to U.S. Patent Application Publication No. 20130037355, published on Feb. 14, 2013 to Baker; Wilfred Jerome et al; for ground-engaging vehicle braking system and methods for using the same. However, it differs from the present invention because Baker; Wilfred Jerome et al; teach a ground-engaging vehicle braking assembly for a vehicle. The assembly generally comprises: a base subassembly mounted to a portion of the vehicle; a common member comprising a first portion and a second portion, the first portion of the common member being rotatably attached to the base subassembly; a first linkage subassembly comprising the first portion of the common member; and a second linkage subassembly comprising the second portion of the common member and a pad member, the pad member being configured to engage a ground surface over which the portion of the vehicle is travelling. An associated method of operating the assembly is also provided, wherein multiple modes of operation are incorporated. A system is also described, wherein at least one processor is configured to move various linkage subassemblies of the assembly based upon one or more predetermined parameters related to mode of operation.

Applicant believes that another reference corresponds to U.S. Patent Application Publication No. 20110198161, published on Aug. 18, 2011 to Louis Lomazzo for master braking system and method therefor. However, it differs from the present invention because Lomazzo teaches a master braking system that provides braking capabilities for vehicles. The master braking system may utilize one or more braking pads that enlarge the contact surface between a vehicle and the road surface as compared to the vehicles tires. The master braking system may comprise an actuator powered by a power source and controlled by a control module. When deployed, a braking pad contacts the road surface to quickly slow or stop a vehicle. The braking pad may then be retracted to allow the vehicle to move freely once again.

Applicant believes that another reference corresponds to U.S. Pat. No. 9,067,675 issued to Kelly L. et al; on Jun. 30, 2015 for Airplane emergency supplemental braking system and method. However, it differs from the present invention because Kelly L. et al; teach a system, an apparatus, and a method for an aerospace vehicle braking system for decelerating an aerospace vehicle on a landing surface. An arm is provided having a first portion connected to the aerospace vehicle and a second portion generally distal to the first portion. The second portion of the arm includes an engagement portion configured to engage the landing surface. The arm is movable between a first position, wherein the engagement portion is substantially disengaged from the landing surface, and a second position, wherein the engagement portion engages the landing surface with a force sufficient to significantly decelerate the aerospace vehicle. The engagement portion is configured to pivot with respect to the arm in response to the direction of travel of the aerospace vehicle upon the landing surface. An actuator is connected to the arm to selectively move the arm between the first position and the second position.

Applicant believes that another reference corresponds to U.S. Pat. No. 8,827,047 issued to Baker; Wilfred Jerome et al; on Sep. 9, 2014 for Ground-engaging vehicle braking system and methods for using the same. However, it differs from the present invention because Baker; Wilfred Jerome et al; teach a ground-engaging vehicle braking assembly for a vehicle. The assembly generally comprises: a base subassembly mounted to a portion of the vehicle; a common member comprising a first portion and a second portion, the first portion of the common member being rotatably attached to the base subassembly; a first linkage subassembly comprising the first portion of the common member; and a second linkage subassembly comprising the second portion of the common member and a pad member, the pad member being configured to engage a ground surface over which the portion of the vehicle is travelling. An associated method of operating the assembly is also provided, wherein multiple modes of operation are incorporated. A system is also described, wherein at least one processor is configured to move various linkage subassemblies of the assembly based upon one or more predetermined parameters related to mode of operation.

Applicant believes that another reference corresponds to U.S. Pat. No. 7,165,658 issued to Peter J. Kehoe on Jan. 23, 2007 for Emergency braking device. However, it differs from the present invention because Kehoe teaches an auxiliary braking device includes a plurality of arcuate housings provided with a plurality of respective sleeves. The housings have an open end portion disposed in front of the vehicle tires. A plurality of flexible chain pads are included that have a plurality of interlocked rings. The chain pads have a width greater than a width of the tires and are stored within the housing sleeves. A plurality of elongated flexible arms having a plurality of first end portions secured to the chain pads and a plurality of second end portions is also described. A mechanism is included for releasing the chain pads from the open end portions of the housings while the vehicle is in motion. The releasing mechanism is connected to the second end portions of the arms.

Applicant believes that another reference corresponds to U.S. Pat. No. 6,401,876 issued to James A. Boros on Jun. 11, 2002 for Vehicle emergency brake and anti-jackknife system. However, it differs from the present invention because Boros teaches a ground-engaging emergency brake and anti-jackknife system for a vehicle which has a brake skid having at least one elongated substantially planar rigid base member, and upper and lower planar surfaces. A replaceable traction member is removably affixed to the base member lower planar surface. A linkage mechanism positions the brake skid in a ground-engaging deployed plane which is parallel to the plane of the vehicle, and when retracted, in a position adjacent to the underside of the vehicle. An actuating mechanism actuates the brake skid between the deployed and retracted positions. The brake skid is centered axially with respect to the longitudinal axis of the vehicle between the rear wheels of the vehicle. The actuating mechanism and linkage mechanism are effective to place a substantial amount of the vehicle weight on the brake skid when the brake skid is in its deployed position.

Applicant believes that another reference corresponds to U.S. Pat. No. 2,796,150 issued to Carmine J. Gambardella on Jun. 18, 1957 for Ground engaging vehicle brake. However, it differs from the present invention because Gambardella; teaches portable lifts of the type comprising a truck mounted on casters and equipped with either a manually or electrically operated lifting mechanism are commonly used in factories and warehouses to convey and stack containers, boxes, palletized loads, etc.

Applicant believes that another reference corresponds to DE Patent No. 19811323 issued to Thomas Klaes on Sep. 23, 1999 for Hydraulic emergency brake used with private and commercial vehicles, motor cycles and trailers. However, it differs from the present invention because Klaes teaches a hydraulic emergency brake, in addition to the existing conventional brake units, is designed as a single wheel or rubber tracked wheels installed on the vehicle. The emergency brake works parallel to the known brake system through proximity sensors.

Applicant believes that another reference corresponds to GB Patent No. 2248428 issued to Jung Soo-Cheol on Apr. 8, 1992 for Auxiliary endless track mechanism for automobiles. However, it differs from the present invention because Soo-Cheol teaches an automobile with an auxiliary endless-track mechanism to enable it to run easily in adverse conditions, to stop very abruptly and to turn in a small space. The endless tracks, which may be of rubber with gripping projections, are mounted on a tubular frame, which is extendable and retractable by hydraulic cylinder towards and away from the ground. Drive to the tracks may be taken from the output shaft of the main transmission by means of bevel gears and shafts, which ultimately drive the track sprockets. The endless-track frame can be rotated about a vertical axis relative to the automobile by an electric motor for tight turns. The endless tracks may extend in response to the sensing of high pressure in the hydraulic wheel braking system.

Applicant believes that another reference corresponds to CN Patent No. 203996165 issued to Li Bin et al; on Dec. 10, 2014 for Auxiliary braking system of automobile. However, it differs from the present invention because Li Bin et al; teach an auxiliary braking system of an automobile comprising an electronic control unit, a chassis height sensor, a vehicle speed sensor, a central control unit and a friction braking device, wherein the electronic control unit is used for controlling an anti-lock braking system of the automobile; the chassis height sensor and the vehicle speed sensor are used for detecting the stable state of a chassis of the automobile; the central control unit acquires output signals of the electronic control unit, the chassis height sensor and the vehicle speed sensor; the friction braking device is installed on the chassis and comprises an air cylinder, a braking connecting rod, a crank and a rocker, one end of each of the crank and the rocker is hinged to the chassis of the automobile, the crank, the braking connecting rod and the rocker are sequentially hinged, a friction damping block is arranged at the end where the braking connecting rod and the rocker are hinged, and the crank is connected with a piston rod of the air cylinder; the friction braking device further comprises a controller which controls actions of the piston rod in the air cylinder according to signals of the central control unit. The controller controls the actions of the piston rod, so that the crank drives the braking connecting rod to move towards the inner side or the outer side of the chassis, and the friction-damping block finishes switching between a safety position and a braking position.

Other patents describing the closest subject matter provide for a number of more or less complicated features that fail to solve the problem in an efficient and economical way. None of these patents suggest the novel features of the present invention.

SUMMARY OF THE INVENTION

The present invention is an emergency braking system for vehicles, comprising a hydraulic unit assembly, an oil accumulator assembly that connects to the hydraulic unit assembly, and a brake assembly that connects to the oil accumulator assembly. The brake assembly comprises at least one brake pad that is mounted underneath a vehicle. When deployed, the at least one brake pad makes contact to produce a predetermined friction with a surface the vehicle is moving upon to stop the vehicle.

The hydraulic unit assembly comprises an oil reservoir containing a first predetermined quantity of oil, connected to an electric motor. The hydraulic unit assembly further comprises an electrovalve.

The oil accumulator assembly comprises an oil accumulator containing a second predetermined quantity of the oil. The oil accumulator is connected with a conduit to the oil reservoir. The electric motor pumps the oil from the oil reservoir to the oil accumulator. The oil accumulator assembly further comprises a bladder, a pedal switch actuator and a closure valve.

The brake assembly comprises at least one brake leg. The at least one brake leg extends to the at least one brake pad. The brake assembly further comprises a hydraulic cylinder and an emergency brake pedal that actuates the pedal switch actuator when the emergency brake pedal is pressed with a predetermined force.

The pedal switch actuator comprises a pressure sensor to detect a lack of oil pressure inside the oil accumulator. The pressure sensor sends a signal to the oil reservoir to refill the oil accumulator to the second predetermined quantity of the oil.

The oil accumulator forces the oil with the bladder to the hydraulic cylinder. The oil accumulator connects to the hydraulic cylinder, and the hydraulic cylinder connects to the at least one brake leg. When the emergency brake pedal is pressed with the predetermined force, the oil accumulator releases the oil at a predetermined pressure to activate the hydraulic cylinder and deploy the at least one brake pad to make contact with the surface the vehicle is moving upon to stop the vehicle.

It is therefore one of the main objects of the present invention to provide an emergency braking system for vehicles deployed against a surface by a hydraulic cylinder.

It is another object of this invention to provide an emergency braking system for vehicles designed to be used in emergency braking situations.

It is another object of this invention to provide an emergency braking system for vehicles, wherein brake legs are deployed in a semi-circular movement, like a swing, by a hydraulic cylinder.

It is another object of this invention to provide an emergency braking system for vehicles comprising a brake pad that deployes in a semi-circular movement, from a center or axis by brake legs, acting as levers that are pushed hydraulically by a hydraulic cylinder.

It is another object of this invention to provide an emergency braking system for vehicles that is retracted by a spring.

It is another object of this invention to provide an emergency braking system for vehicles that is deployed by a hydraulic cylinder.

It is another object of this invention to provide an emergency braking system for vehicles that uses one or two big brake pads of three square feet each, requiring only a hydraulic cylinder to be deployed.

It is another object of this invention to provide an emergency braking system for vehicles, which is of a durable and reliable construction.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
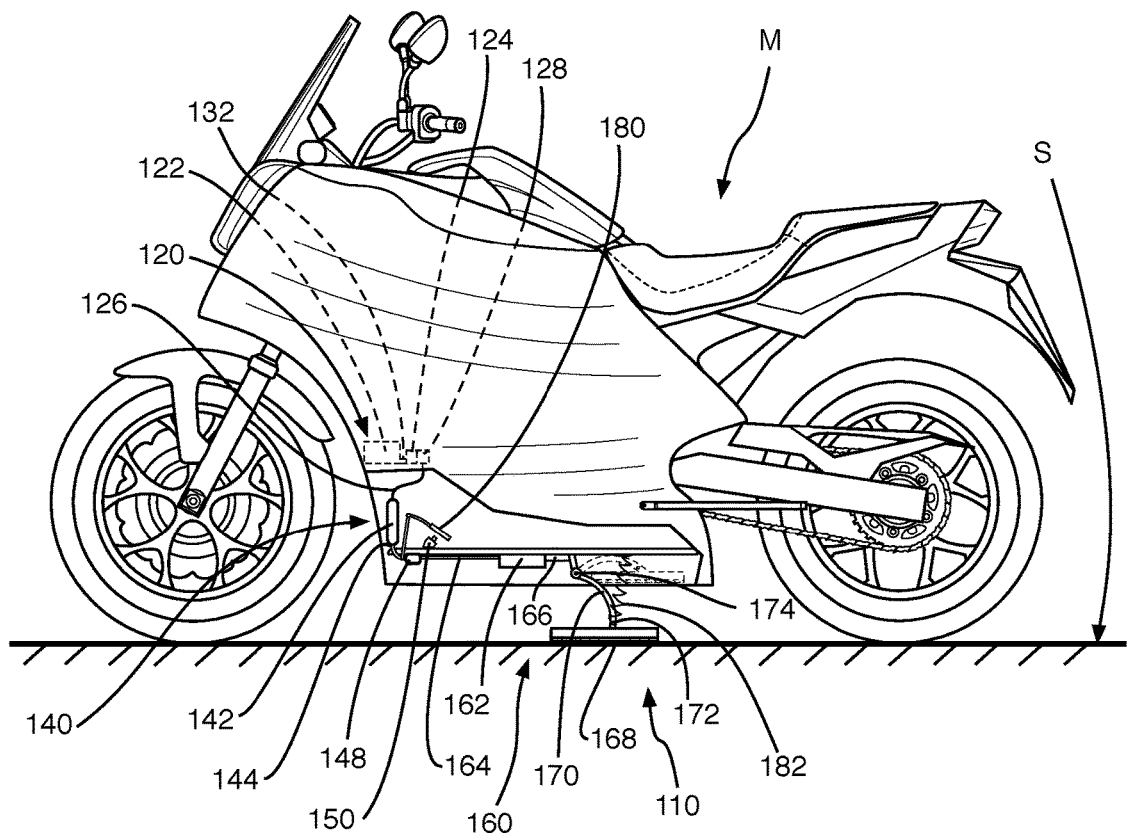
FIG. 1 represents a side view of a motorcycle with the present invention mounted thereon and deployed to stop the motorcycle.

Referring now to the drawings, the present invention is an emergency braking system for vehicles and is generally referred to with numeral 110. Vehicles include, but are not limited to, motorcycles, automobiles, light trucks, mid trucks, heavy trucks, sport utility vehicles, vans, recreational vehicles, and otherwise any other type of vehicles for transportation. It can be observed that it basically includes hydraulic unit assembly 120, oil accumulator assembly 140, and brake assembly 160.

As seen in FIG. 1, hydraulic unit assembly 120 connects to oil accumulator assembly 140 that connects to brake assembly 160. Hydraulic unit assembly 120 comprises oil reservoir 122 containing a first predetermined quantity of oil. Oil reservoir 122 is connected to electric motor 124 by tubing 132. In a preferred embodiment, hydraulic unit assembly 120 is located near an engine area of motorcycle M as illustrated.

In a preferred embodiment, oil reservoir 122 is a small metal container that stores the first predetermined quantity of oil utilized by hydraulic unit assembly 120. Oil reservoir 122 measures a predetermined length, height, and width.

In a preferred embodiment, electric motor 124 has a predetermined voltage and wattage. Electric motor 124 pumps oil from oil reservoir 122, through electrovalve 128 and via conduit 126 to oil accumulator 142. Electrovalve 128 is started by a spool, which starts when pedal switch actuator 150 is pushed. Electrovalve 128 sends an electric signal to maintain oil accumulator 142 approximately full with a second predetermined quantity of oil to be used when be required.

Oil accumulator assembly 140 comprises oil accumulator 142. When actuated, oil accumulator 142 discharges oil therein at a high pressure. In a preferred embodiment, present invention 110 comprises oil accumulator 142 that stores a predetermined quantity of oil and operates with a predetermined pressure measured in psi. In a preferred embodiment, oil accumulator 142 measures a predetermined length, height, and width. As an example, oil reservoir 122 has more than double the capacity of oil accumulator 142 to ensure that there is enough oil stored. Oil accumulator 142 is connected to oil reservoir 122 by conduit 126. In a preferred embodiment, conduit 126 is stainless steel tubing, has a predetermined diameter, and operates with a predetermined pressure measured in psi. Electric motor 124 pumps the oil from oil reservoir 122 to oil accumulator 142.

Oil accumulator assembly 140 further comprises bladder 144, closure valve 148, and pedal switch actuator 150. Bladder 144 is a high pressure bladder made of a durable material such as, but not limited to, nylon and/or para-aramid synthetic fibers which is filled with Nitrogen to a predetermined pressure measured in psi. Bladder 144 is located inside oil accumulator 122 and is filled with nitrogen through an orifice located on a top section of oil accumulator 142 to place pressure over the oil. In a preferred embodiment, when bladder 144 is full of nitrogen, it occupies approximately 80% of a volume within accumulator 142. Oil accumulator 142 forces the oil with bladder 144 to hydraulic cylinder 162.

Closure valve 148 is positioned between oil accumulator 142 and hydraulic cylinder 162. Closure valve 148 functions to close or shutdown the hydraulic circuit of present invention 110. After accumulator 142 has been filled with enough oil, closure valve 148 prevents oil accumulator 142 from emptying when is not operating. Closure valve 148 therefore maintains oil pressure in oil accumulator 142 until a pressure sensor within pedal switch actuator 150 sends a signal to release the oil to hydraulic cylinder 162, and thereafter, permitting oil accumulator 142 to be filled again with oil.

More specifically, the pressure sensor within pedal switch actuator 150 is installed next to oil accumulator 142, and its function is to keep an approximately constant pressure inside oil accumulator 142. The pressure sensor sends a signal to oil reservoir 122 to refill oil accumulator 142 with the second predetermined quantity of the oil. Oil accumulator 142 discharges most oil therein when brake pad 168 is deployed. Once a lack of oil pressure is detected by the pressure sensor, it sends a signal to hydraulic unit assembly 120 to begin to fill up oil accumulator 142 again to be ready to deploy brake pad 168. The filling up of oil may take seconds to minutes. The pressure sensor recognizes when oil accumulator 142 has oil and predetermined pressure. Once a desired oil and predetermined pressure is achieved, a signal is sent to hydraulic unit assembly 120 to stop pumping oil.

Brake assembly 160 comprises hydraulic cylinder 162, hydraulic connection 164, brake rod 166, emergency brake pedal 180, and spring 182. Brake assembly 160 further comprises at least one brake pad 168 that is mounted underneath motorcycle M. At least one brake leg 170 extends to a respective at least one brake pad 168. Oil accumulator 142 connects to hydraulic cylinder 162, and hydraulic cylinder 162 connects to at least one brake leg 170. At least one brake leg 170 is joined to brake rod 166 with upper joint 174, and brake rod 166 connects to hydraulic cylinder 162. At least one brake leg 170 is joined to at least one brake pad 168 by lower joint 172.

Hydraulic cylinder 162 makes the mechanical movement to deploy at least one brake pad 168 to make contact with surface S. In a preferred embodiment, hydraulic cylinder 162 is mounted onto an underside motorcycle M. Hydraulic cylinder 162 is moved by the oil that is released from oil accumulator 142 when pedal switch actuator 150 is activated by emergency brake pedal 180 with a predetermined pressure. Bladder 144 inside oil accumulator 142 provides a predetermined pressure that pushes the oil inside hydraulic cylinder 162.

Hydraulic cylinder 162 pushes brake rod 166 with a predetermined amount of pressure that is transferred to at least one brake leg 170 deploying brake pad 168 to make contact with surface S with enough pressure to produce friction to stop motorcycle M. Formula P=f/a calculated the above parameter, wherein Pressure (P) is equal to force (f) given in pounds divided into the area inside hydraulic cylinder 162.

In operation, oil accumulator 142 is activated and discharges oil to hydraulic cylinder 162 with a predetermined amount of pressure. This makes hydraulic cylinder 162 activate brake rod 166. Brake rod 166 engages two levers that deploys brake legs 170 connected to brake pad 168, which make contact against surface S with approximately 100 to 180 pounds of pressure to produce a predetermined friction to stop motorcycle M. This down force is calculated according to an internal oil volume of hydraulic cylinder 162, the size of brake leg 170, and a distance that brake legs 170 have to move to contact surface S. The time that it takes to deploy brake pad 168 is calculated with the formula Q=v/t, where:

Q is the oil inside oil accumulator 142 in gallons that is released into hydraulic cylinder 162 and operates with a predetermined pressure measured in psi;

v is the oil volume necessary to fill oil accumulator 142 in cubic inches (CI); and t is the time in seconds that hydraulic cylinder 162 requires in deploying brake leg 170.

Figure 2:
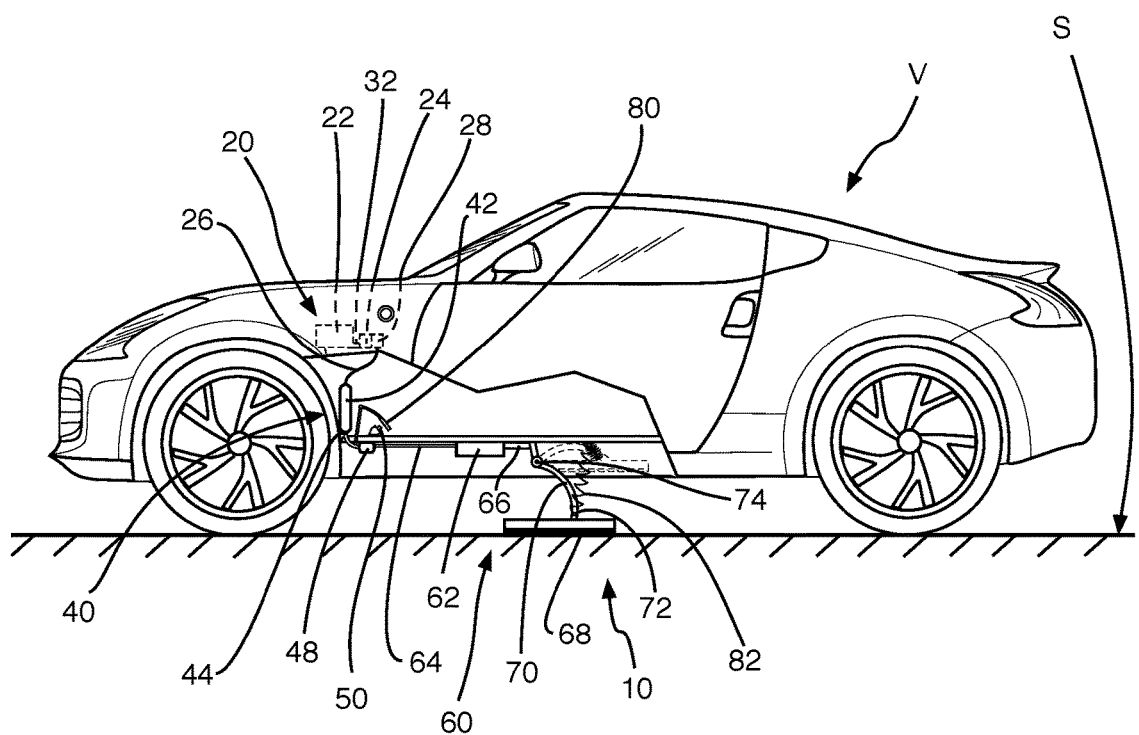
FIG. 2 represents a side view of an automobile with the present invention mounted thereon and deployed to stop the automobile.

As seen in FIG. 2 in an alternate embodiment, hydraulic unit assembly 20 connects to oil accumulator assembly 40 that connects to brake assembly 60. Hydraulic unit assembly 20 comprises oil reservoir 22 containing a first predetermined quantity of oil. Oil reservoir 22 is connected to electric motor 24 by tubing 32. In an embodiment, hydraulic unit assembly 20 is located in an engine compartment of vehicle V as illustrated. In alternate embodiments, hydraulic unit assembly 20 may be located on the underside or trunk of vehicle V.

In an embodiment, oil reservoir 22 is a small metal container that stores the first predetermined quantity of oil utilized by hydraulic unit assembly 20. Oil reservoir 22 measures approximately 25" long, 8" high and 8" wide, and weighs approximately 35 pounds empty, without oil.

In an embodiment, electric motor 24 is a 12 volt, 800 watt electric motor. Electric motor 24 pumps oil from oil reservoir 22, through electrovalve 28 and via conduit 26 to oil accumulator 42. Electrovalve 28 is started by a spool, which starts when pedal switch actuator 50 is pushed. Electrovalve 28 sends an electric signal to maintain oil accumulator 42 approximately full with a second predetermined quantity of oil to be used when be required.

Oil accumulator assembly 40 comprises oil accumulator 42. When actuated, oil accumulator 42 discharges oil therein at a high pressure. In an embodiment, present invention 10 comprises oil accumulator 42 stores approximately a ¼ gallon of oil and operates with approximate pressure of 2000 psi. In an embodiment, oil accumulator 42 is approximately 17" long, has a 5" diameter, and weighs approximately 20 pounds when empty. Oil reservoir 22 has more than double the capacity of oil accumulator 42. For example, if oil accumulator 42 has a ¼ gallon capacity, oil reservoir 22 has a ¾ gallon capacity, to ensure that there is enough oil stored. Oil accumulator 42 is connected to oil reservoir 22 by conduit 26. In an embodiment, conduit 26 is stainless steel tubing, has an approximate ⅜" diameter, and is designed to work with 2000 psi of pressure. Electric motor 24 pumps the oil from oil reservoir 22 to oil accumulator 42.

Oil accumulator assembly 40 further comprises bladder 44, closure valve 48, and pedal switch actuator 50. Bladder 44 is a high pressure bladder made of a durable material such as, but not limited to, nylon and/or para-aramid synthetic fibers which is filled with Nitrogen to approximately 2000 psi. Bladder 44 is located inside oil accumulator 22 and is filled with nitrogen through an orifice located on a top section of oil accumulator 42 to place the approximately 2000 psi of pressure over the oil. In an embodiment, when bladder 44 is full of nitrogen, it occupies approximately 80% of a volume within accumulator 42. Oil accumulator 42 forces the oil with bladder 44 to hydraulic cylinder 62.

Closure valve 48 is positioned between oil accumulator 42 and hydraulic cylinder 62. Closure valve 48 functions to close or shutdown the hydraulic circuit of present invention 10. After accumulator 42 has been filled with enough oil, closure valve 48 prevents oil accumulator 42 from emptying when is not operating. Closure valve 48 therefore maintains oil pressure in oil accumulator 42 until a pressure sensor within pedal switch actuator 50 sends a signal to release the oil to hydraulic cylinder 62, and thereafter, permitting oil accumulator 42 to be filled again with oil.

More specifically, the pressure sensor within pedal switch actuator 50 is installed next to oil accumulator 42, and its function is to keep an approximately constant pressure of 2000 psi inside oil accumulator 42. The pressure sensor sends a signal to oil reservoir 22 to refill oil accumulator 42 with the second predetermined quantity of the oil. Oil accumulator 42 discharges most oil therein when brake pad 68 is deployed. Once a lack of oil pressure is detected by the pressure sensor, it sends a signal to hydraulic unit assembly 20 to begin to fill up oil accumulator 42 again to be ready to deploy brake pad 68. The filling up of oil may take 5 to 10 minutes. The pressure sensor recognizes when oil accumulator 42 has oil and predetermined pressure. Once a desired oil and predetermined pressure is achieved, a signal is sent to hydraulic unit assembly 20 to stop pumping oil.

Brake assembly 60 comprises hydraulic cylinder 62, hydraulic connection 64, brake rod 66, emergency brake pedal 80, and spring 82. Brake assembly 60 further comprises at least one brake pad 68 that is mounted underneath vehicle V. At least one brake leg 70 extends to a respective at least one brake pad 68. Oil accumulator 42 connects to hydraulic cylinder 62, and hydraulic cylinder 62 connects to at least one brake leg 70. At least one brake leg 70 is joined to brake rod 66 with upper joint 74, and brake rod 66 connects to hydraulic cylinder 62. At least one brake leg 70 is joined to at least one brake pad 68 by lower joint 72.

Hydraulic cylinder 62 makes the mechanical movement to deploy at least one brake pad 68 to make contact with surface S. In an embodiment, hydraulic cylinder 62 is mounted onto an underside vehicle V. Hydraulic cylinder 62 is moved by the oil that is released from oil accumulator 42 when pedal switch actuator 50 is activated by emergency brake pedal 80 with a predetermined pressure. Bladder 44 inside oil accumulator 42 provides a predetermined pressure that pushes the oil inside hydraulic cylinder 62.

Hydraulic cylinder 62 pushes brake rod 66 with 6000 pounds of pressure that is transferred to at least one brake leg 70 deploying brake pad 68 to make contact with surface S with enough pressure to produce friction to stop vehicle V. Formula P=f/a calculated the above parameter, wherein Pressure (P) is equal to force (f) given in pounds divided into the area inside hydraulic cylinder 62.

In operation, oil accumulator 42 is activated and discharges oil to hydraulic cylinder 62 with an approximate pressure of 1800 to 2000 psi. This makes hydraulic cylinder 62 activate brake rod 66. Brake rod 66 engages two levers that deploys brake legs 70 connected to brake pad 68, which make contact against surface S with approximately 400 to 500 pounds of pressure to produce a predetermined friction to stop vehicle V. This down force is calculated according to an internal oil volume of hydraulic cylinder 62, the size of brake leg 70, and a distance that brake legs 70 have to move to contact surface S. The time that it takes to deploy brake pad 68 is calculated with the formula $Q=v/t$, where:

Q is the oil inside oil accumulator 42 in gallons that is released into hydraulic cylinder 62 with approximately 2000 psi of pressure;

v is the oil volume necessary to fill oil accumulator 42 in cubic inches (CI); and t is the time in seconds that hydraulic cylinder 62 requires in deploying brake leg 70.

Figure 3:
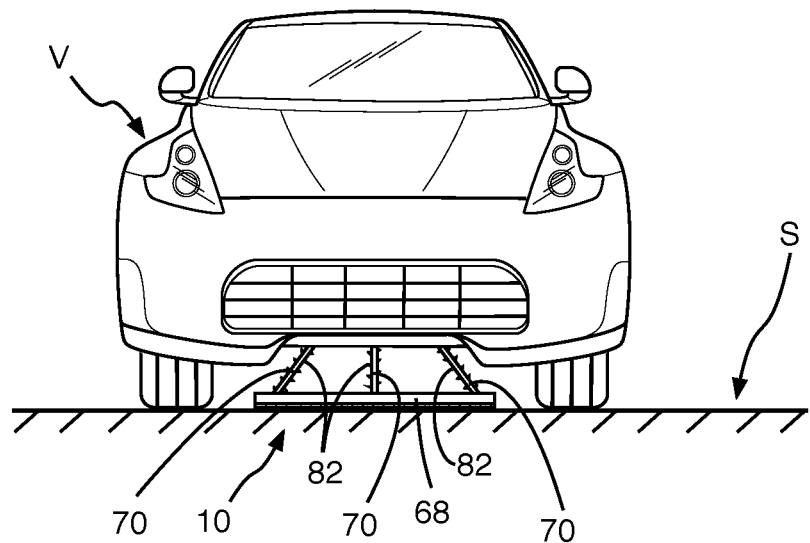
FIG. 3 is a front view of the automobile seen in FIG. 2 with the present invention mounted thereon and deployed to stop the automobile.

As seen in FIG. 3, in a deployed position at least one brake pad 68 makes contact to produce a predetermined friction with surface S vehicle V is moving upon to stop vehicle V. In an embodiment, there are three brake legs 70 that extend from brake pad 68.

Figure 4:
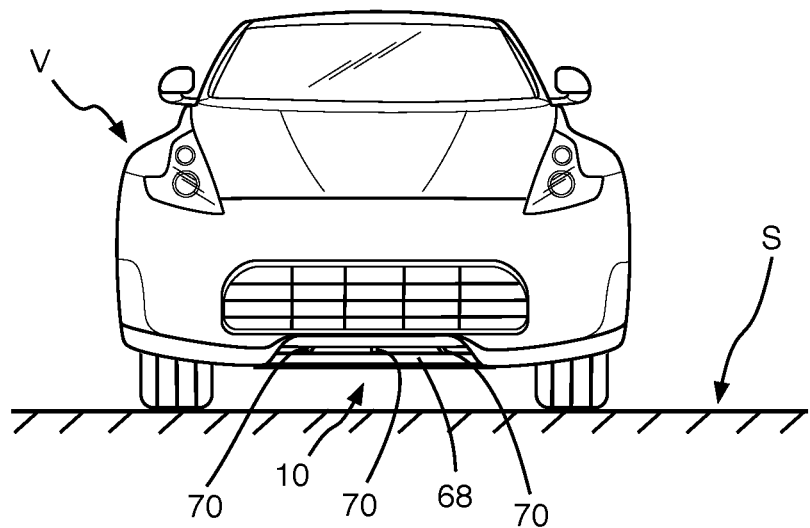
FIG. 4 is a front view of the automobile seen in FIG. 2 with the present invention mounted thereon and retracted.

As seen in FIG. 4, in a retracted position at least one brake pad 68 with brake legs 70 are positioned underneath vehicle V approximately horizontal to surface S. Brake legs 70 with brake pad 68 are retracted by spring 82, seen in FIGS. 2 and 3, that is connected from lower joint 72 to the bottom of vehicle V.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An emergency braking system for vehicles, consisting essentially of:

A) a hydraulic unit assembly having an oil reservoir containing a first predetermined quantity of oil, said hydraulic unit assembly further having an electric motor and an electrovalve, said oil reservoir being connected to said electric motor;

B) an oil accumulator assembly that connects to said hydraulic unit assembly, said oil accumulator assembly having an oil accumulator containing a second predetermined quantity of said oil, a conduit connects said oil reservoir to said oil accumulator, said electric motor pumps said oil from said oil reservoir to said oil accumulator, said oil accumulator assembly further having a bladder, a pedal switch actuator and a closure valve; and C) a brake assembly that connects to said oil accumulator assembly, said brake assembly has at least one brake pad that is mounted underneath a vehicle, when deployed said at least one brake pad makes contact to produce a predetermined friction with a surface said vehicle is moving upon to stop said vehicle, said brake assembly having at least one brake leg that extends to said at least one brake pad, said brake assembly further having a hydraulic cylinder and an emergency brake pedal that actuates said pedal switch actuator when said emergency brake pedal is pressed with a predetermined force, said pedal switch actuator having a pressure sensor to detect a lack of oil pressure inside said oil accumulator, said pressure sensor sends a signal to said oil reservoir to refill said oil accumulator to said second predetermined quantity of said oil, said oil accumulator forces said oil with said bladder to said hydraulic cylinder, said oil accumulator connects to said hydraulic cylinder and said hydraulic cylinder connects to said at least one brake leg, when said emergency brake pedal is pressed with said predetermined force, said oil accumulator releases said oil at a predetermined pressure to activate said hydraulic cylinder and deploys said at least one brake pad to make contact with said surface said vehicle is moving upon to stop said vehicle.

\* \* \* \* \*